US011881662B2

(12) United States Patent
Dobler

(10) Patent No.: US 11,881,662 B2
(45) Date of Patent: Jan. 23, 2024

(54) 8+2 WAY XLR PCB FEMALE CONNECTOR

(71) Applicant: Neutrik AG, Schaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 0 days.

(21) Appl. No.: 17/629,221

(22) PCT Filed: Aug. 12, 2020

(86) PCT No.: PCT/EP2020/025371
§ 371 (c)(1),
(2) Date: Jan. 21, 2022

(87) PCT Pub. No.: WO2021/028077
PCT Pub. Date: Feb. 18, 2021

(65) Prior Publication Data

US 2022/0320807 A1 Oct. 6, 2022

(30) Foreign Application Priority Data

Aug. 13, 2019 (CN) ........................ 201921311838.7

(51) Int. Cl.
*H01R 24/50* (2011.01)
*H01R 107/00* (2006.01)

(52) U.S. Cl.
CPC ......... *H01R 24/50* (2013.01); *H01R 2107/00* (2013.01)

(58) Field of Classification Search
CPC ................ H01R 24/50; H01R 2107/00; H01R 13/4367; H01R 12/724; H01R 13/02
(Continued)

(56) References Cited

U.S. PATENT DOCUMENTS 4,921,431 A 5/1990 Garay et al.
5,310,354 A 5/1994 Oswald, Jr.
(Continued)

FOREIGN PATENT DOCUMENTS

EP 0 561 202 A1 9/1993
EP 3 402 012 A1 11/2018
(Continued)

OTHER PUBLICATIONS

International Search Report in .PCT/EP2020/025371, dated Oct. 30, 2020.

*Primary Examiner* — Alexander Gilman
(74) *Attorney, Agent, or Firm* — Volpe Koenig

(57) ABSTRACT

An electrical built-in plug connector having a housing with at least one mounting structure projecting transversely to the longitudinal axis of the housing, with more than five electrical contacts fixed in the housing, wherein the contacts are guided outwards at one end of the housing parallel to the longitudinal axis of the housing, wherein the end sections of the sections of the contacts located outside of the housing are angled relative to their sections located inside the housing, and their connection sections provided for connecting to a circuit board end in a common plane, which plane is parallel to the longitudinal axis of the housing, wherein the connection regions are arranged in groups, and the individual groups are situated on at least three parallel straight lines, which are part of the common plane, wherein the ends of the sections of the contacts guided in parallel out of the housing have the same distance in the direction of the longitudinal axis of the housing as the parallel straight lines.

13 Claims, 3 Drawing Sheets

Figure 1:
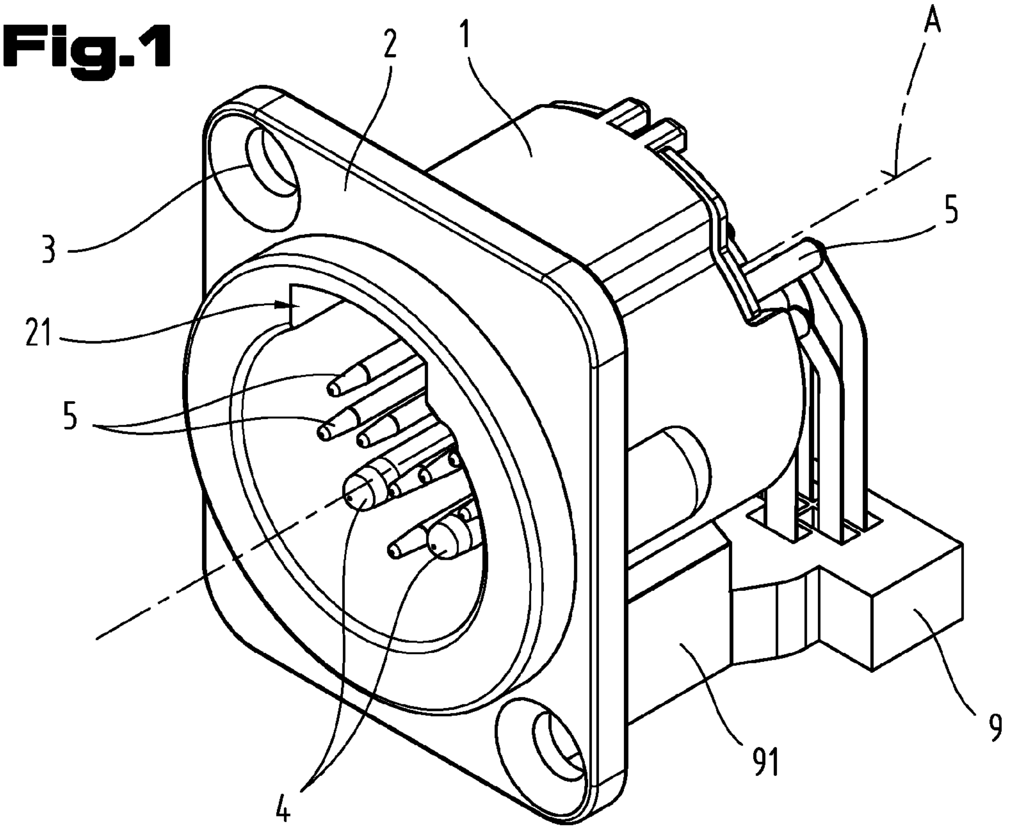

(58) Field of Classification Search
USPC .......................................................... 439/695
See application file for complete search history.

(56) References Cited

U.S. PATENT DOCUMENTS

| | | | | | |
|---|---|---|---|---|---|
| 5,752,854 | A | 5/1998 | Capp et al. | | |
| 5,975,917 | A * | 11/1999 | Wang | H01R 43/20 | 439/701 |
| 8,070,529 | B2 * | 12/2011 | Xiong | H01R 12/725 | 439/676 |
| 8,292,662 | B2 * | 10/2012 | Yang | H01R 13/5202 | 439/271 |
| 9,502,809 | B2 * | 11/2016 | Komiyama | H01R 13/502 | |
| 9,590,339 | B2 * | 3/2017 | Oberski | H01R 12/75 | |
| 10,256,579 | B2 * | 4/2019 | Fuehrer | H01R 4/20 | |
| 10,454,200 | B2 * | 10/2019 | Uenosono | H01R 13/436 | |
| 10,522,952 | B2 * | 12/2019 | Yin | H01R 13/6683 | |
| 10,547,131 | B2 * | 1/2020 | Feldner | H01R 27/02 | |
| 2011/0053427 | A1 * | 3/2011 | Tung | H01R 13/506 | 439/660 |
| 2016/0111831 | A1 * | 4/2016 | Kawai | H01R 13/04 | 439/620.21 |
| 2017/0279210 | A1 * | 9/2017 | Kraemer | H01R 13/506 | |
| 2020/0161789 | A1 * | 5/2020 | Flaherty, IV | H01R 13/6275 | |
| 2020/0185843 | A1 * | 6/2020 | Miyamura | H01R 13/41 | |
| 2021/0296828 | A1 * | 9/2021 | Maesoba | H01R 13/6581 | |
| 2021/0320459 | A1 * | 10/2021 | Maesoba | H01R 13/6582 | |
| 2021/0351538 | A1 * | 11/2021 | Yamamoto | H01R 13/641 | |
| 2022/0094109 | A1 * | 3/2022 | Ko | H01R 12/716 | |
| 2022/0320807 | A1 * | 10/2022 | Dobler | H01R 24/50 | |
| 2023/0009193 | A1 * | 1/2023 | Yu | H01R 12/79 | |

FOREIGN PATENT DOCUMENTS

| | | |
|---|---|---|
| JP | H391414 | 4/1991 |
| JP | 2006019256 | 1/2006 |
| JP | 2015-115546 A | 6/2015 |

* cited by examiner

8+2 WAY XLR PCB FEMALE CONNECTOR

CROSS REFERENCE TO RELATED APPLICATIONS

This application is the National Stage of PCT/EP2020/025371 filed on Aug. 12, 2020, which claims priority under 35 U.S.C. § 119 of Chinese Application No. 201921311838.7 filed on Aug. 13, 2019, the disclosure of which is incorporated by reference. The international application under PCT article 21(2) was not published in English.

TECHNICAL FIELD

The invention relates to an electrical built-in plug connector, in particular for connecting to electronic conductor boards.

PRIOR ART

Such built-in plug connectors, also referred to as built-in sockets or chassis sockets, are intended for being built into control panels, control cabinets, or also in the walls of device housings, inter alia also in the XLR embodiment, and configured for being connected to standard conductor boards which are used in the entertainment industry. They are available in a wide variety of embodiments, meaning having different numbers and designs of the contacts, and with different ground and connection variants, and as male and female plugs.

Three- to five-pin built-in sockets are also known in embodiments for connecting to horizontal conductor boards. The electrical contacts of these embodiments are guided outwards at an end of the housing parallel to the longitudinal axis of the housing and subsequently extend in an angled manner, wherein the connection regions to the conductor board end in a common plane, which plane is parallel to the longitudinal axis of the housing. In this regard, the connection regions may also be located on the outer side of the plate-shaped element. If even more data and/or energy channels are required, these built-in sockets can no longer be used.

On the other hand, XLR plug connectors of the type 8+2 are known, which also offer two energy channels in addition to eight data channels. Due to the plurality of the contacts protruding outwardly at the rear end face, the connection to a conductor board has, to date, only been realized in a vertical arrangement, in which the conductor board is oriented in parallel with the rear end face and thus transversely to the longitudinal axis of the housing. Thus, a connection to horizontal conductor boards is not possible, which limits the field of application of these plug connectors.

In a completely different technical field, JP 2015 115546 A discloses a “surface-mounted device” component, the circuit board of which is fixedly provided with a plug housing mounted on its surface. Contact pins protrude freely into the interior of said housing, that is into the receiving region for a complementary plug connector and are guided outwards on the rear side in an axially parallel manner. On the rear side of the housing, a deflection by 90° in the direction towards the circuit board takes place, where a solder connection between the freely extending ends of the contact pins and the connection contacts on the circuit board is established. The ends of the contact pins are present in an arrangement of three parallel straight lines.

The subject matter of US 2011/053427 A1 is an electrical plug connector, which is also constructed for being mounted on a switching arrangement. Contact pins are held in two successive insulating contact carriers and are deflected by 90° still inside this contact carrier arrangement. The ends of the contact pins emerge from the contact carrier arrangement in a deflected manner and are then present in an arrangement of multiple parallel straight lines. The contact carrier arrangement itself is inserted into a metallic housing from the rear side and protrudes rearwards beyond this housing.

EP 0561202 A1 relates to ground terminals with an integral tail shield. Its connector arrangement is configured for installation on a switching arrangement and comprises an insulating housing and an arrangement of contact element held directly in this housing. These are arranged in a plurality of rows and columns in the housing. The contact elements are oriented in parallel with one another and towards the insertion direction and also emerge from the housing at the rear side, i.e. Opposite the insertion side, in this arrangement. Outside the housing, each contact element has a curvature or a curved section, which subsequently extends in a straight line further to the switching arrangement, where a contacting also takes place in an arrangement with multiple rows and columns.

Essential Features of the Invention

The object underlying the invention was a plug connector with a great number of data and/or energy channels, which plug connector additionally is suitable for connecting to a horizontal conductor board.

In order to achieve this technical object, an electrical built-in plug connector is suggested, having a housing, with a contact carrier made of electrically insulating material, which is inserted in the housing in parallel with its longitudinal axis, and having more than five electrical contacts fixed in the housing, wherein the contacts are guided outwards at an end of the housing parallel to the longitudinal axis of the housing. If the contacts are fixed in a contact carrier, which is inserted into the housing in parallel with the housing’s longitudinal axis, a great number of contacting variants and thus different built-in plug connectors can be realized with one housing type.

Preferably, this plane is radially further outside than a tangential plane to the housing parallel thereto.

The connection regions of the sections of the contacts, which sections extend in an angled manner and preferably perpendicular to the longitudinal axis of the housing, are arranged in groups, wherein the individual groups are situated on at least three parallel straight lines, which are part of the common plane, in which the connection sections end.

The difficulties of deflecting the contacts from a direction parallel to the longitudinal axis of the housing to a direction that is angled with respect to the former can be avoided by the ends of the sections of the contacts guided in parallel out of the housing having the same distance as the parallel straight lines in the direction of the longitudinal axis of the housing. This results in a position of the deflection points, from the parallel to the angled direction, that is staggered along the longitudinal axis of the housing, which ensures sufficient space for the contactless arrangement and a course of the angled sections of the contacts being sufficiently spaced apart from one another.

A particularly favorable variant for fixing the contact carrier in the housing provides that the contact carrier is fixed in the housing by means of a holding element on that side of the housing on which the contacts are guided on its outer side.

Preferably, eight contacts for data transfer and two contacts for transfer of energy are provided for meeting the requirements of the standard structure.

Usefully, it is provided in this regard that the contacts for the transfer of energy have a greater diameter than the contacts for data transfer. Thereby, higher current strengths can be transferred for sufficient energy supply while for data transfer, which works with lower voltages and current strengths, smaller conductor cross-sections are sufficient of which a higher number per socket may be provided.

An embodiment, in which the holding element is a ring projecting inwards from the housing wall at least in some locations and connected to the housing wall in at least one location, is preferred and easy to handle.

A secure connection between the holding element and the holding element can be established easily and quickly of the holding element and the housing wall are crimped together in at least one location.

A preferred embodiment of a built-in plug connector as a male plug provides that the electrical contacts are designed as contact pins.

For configuring the built-in plug connector as a female plug, however, an embodiment of the electrical contacts as at least circular contact openings is provided.

As the built-in plug connector according to the invention is to be mounted on a control panel or in a device housing, a mounting structure is provided according to a first embodiment, which is at least a laterally projecting eye having a mounting bore. Typically, two eyes being opposite with respect to the central axis of the housing are provided.

A different variant that is advantageous as it is very stable provides that the mounting structure is a flange projecting over the entire circumference of the housing, in which flange at least one mounting bore is formed. Here, as well, at least two mounting bores being opposite with respect to the central axis of the housing are arranged in the flange. This may, in this regard, have a rectangular shape or also a circular or elliptical shape.

The angled sections of the contacts are straight and extend in parallel with one another across a majority of their lengths according to a preferred embodiment of the built-in plug connector. In a simple design, this results in the necessary mutual distance of the electrically conductive elements.

To facilitate the installation of the built-in plug connector, in particular its contacts, the angled sections are separate elements—i.e. not manufactured in one piece with the contacts accommodated in the housing and guided outwards through the contact carrier—and are directly connected to the sections of the contacts guided to the outer side of the housing. This may be carried out by means of bolting, riveting, or also welding and possibly also adhering with conductive adhesives.

In order to ensure a precisely defined geometric configuration of the connection regions to the conductor board, the angled sections are fixed in a common holding plate just ahead of their connection regions. Preferably, this holding plane is also situated radially outside of a parallel tangential plane to the housing.

The common holding plate may also have an extension running adjacently along the housing, in order to, on the one hand, ensure a full support and good connection to the conductor plate, and to, on the other hand, also connect the holding plate to the housing in a better and mechanically secured manner. For this purpose, interlocking guide and/or stabilizing arrangements may be arranged in and/or on the housing and the extension of the holding plate.

DRAWINGS

Figure 2:
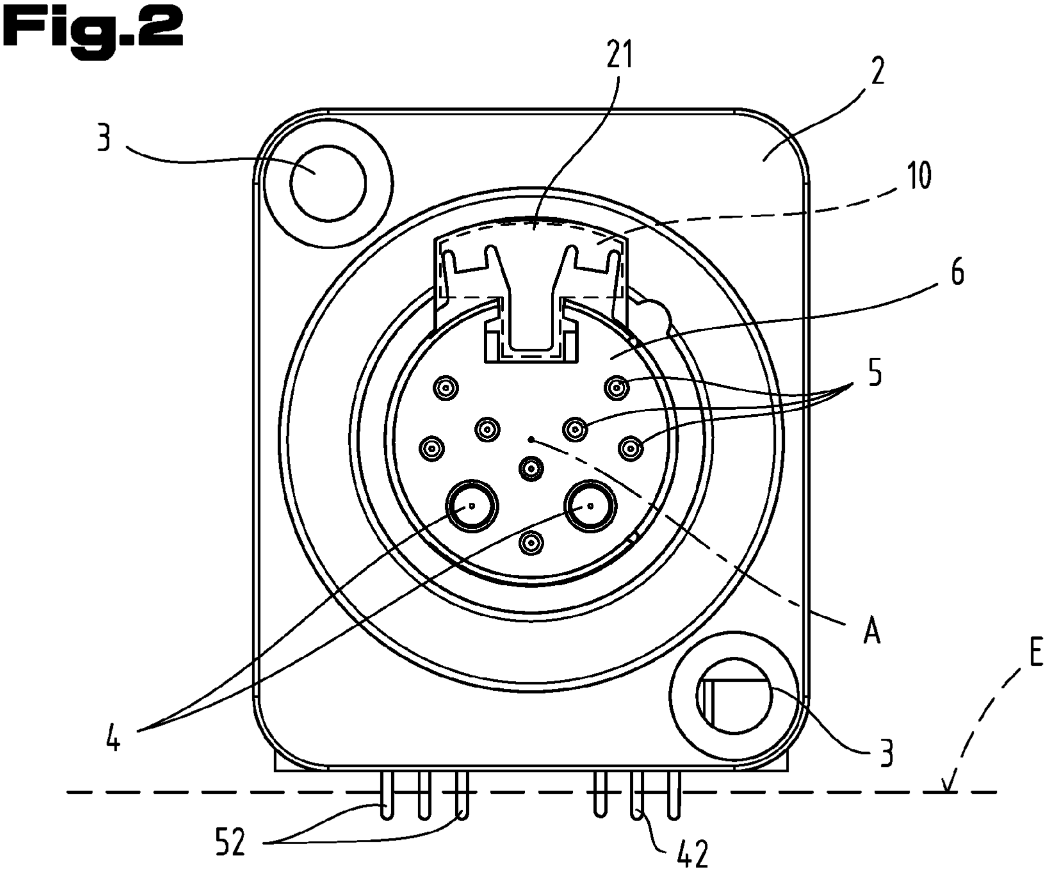
Figure 3:
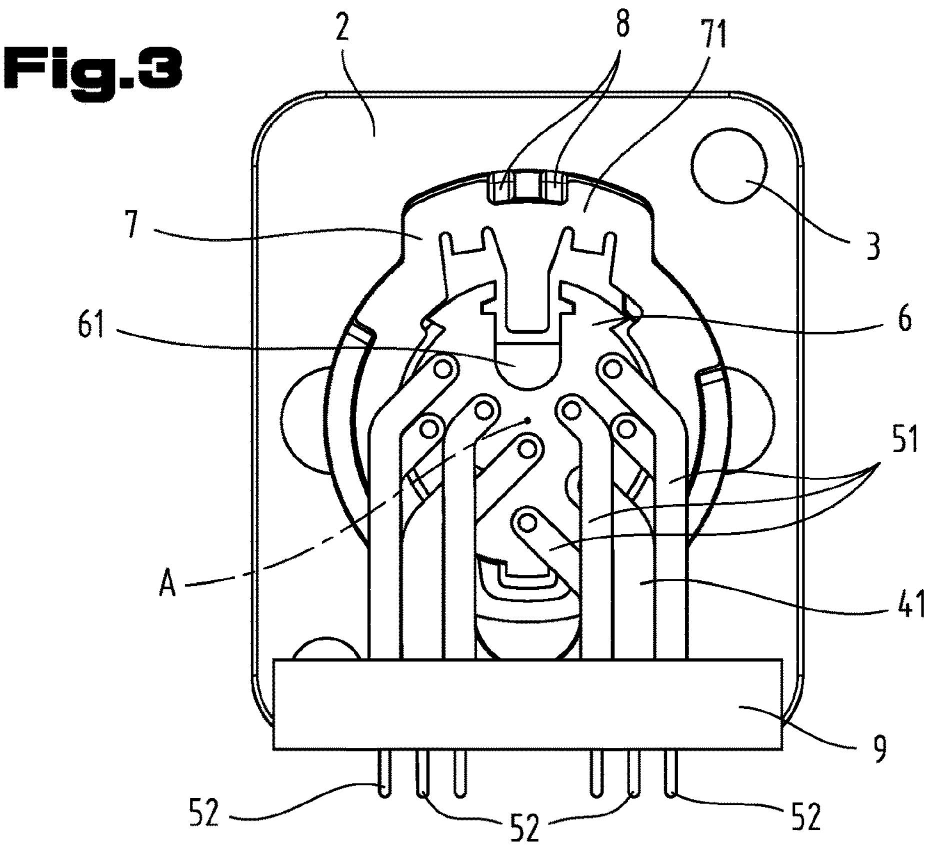
Figure 4:
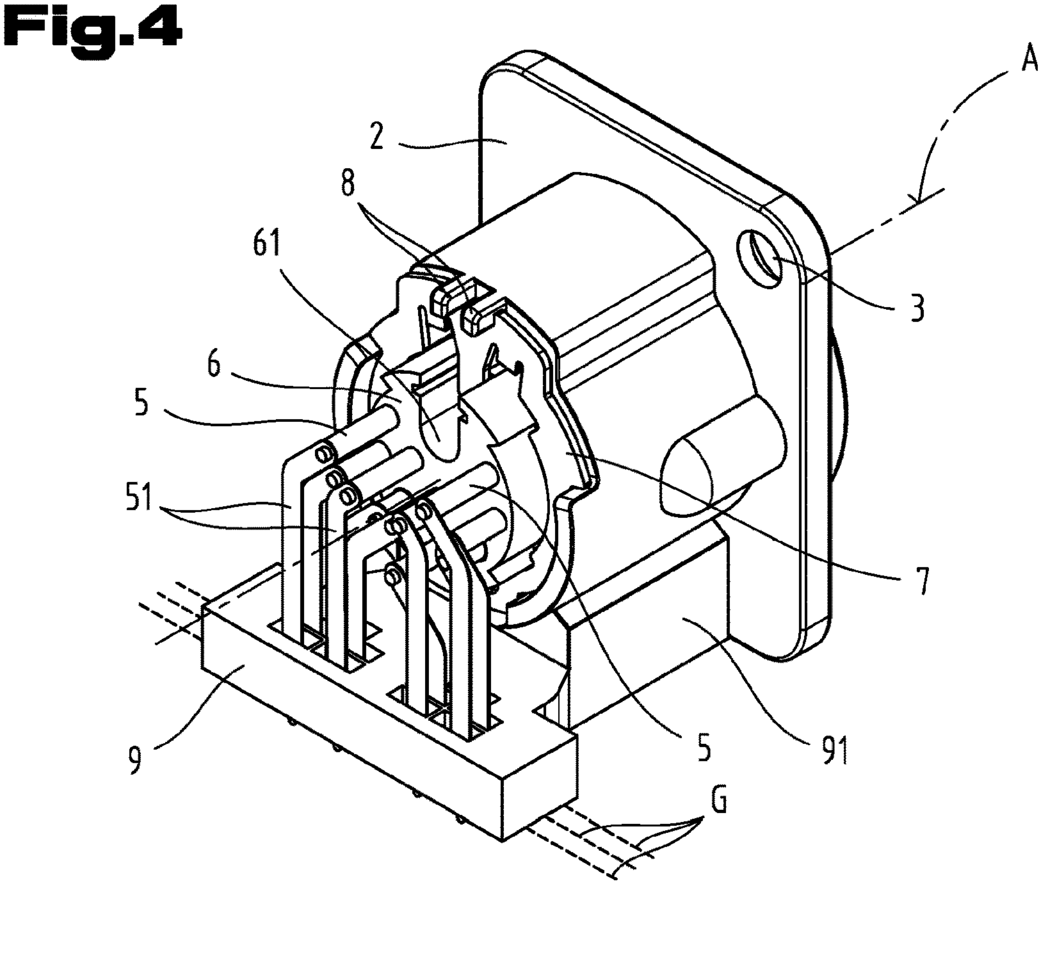
Figure 5:
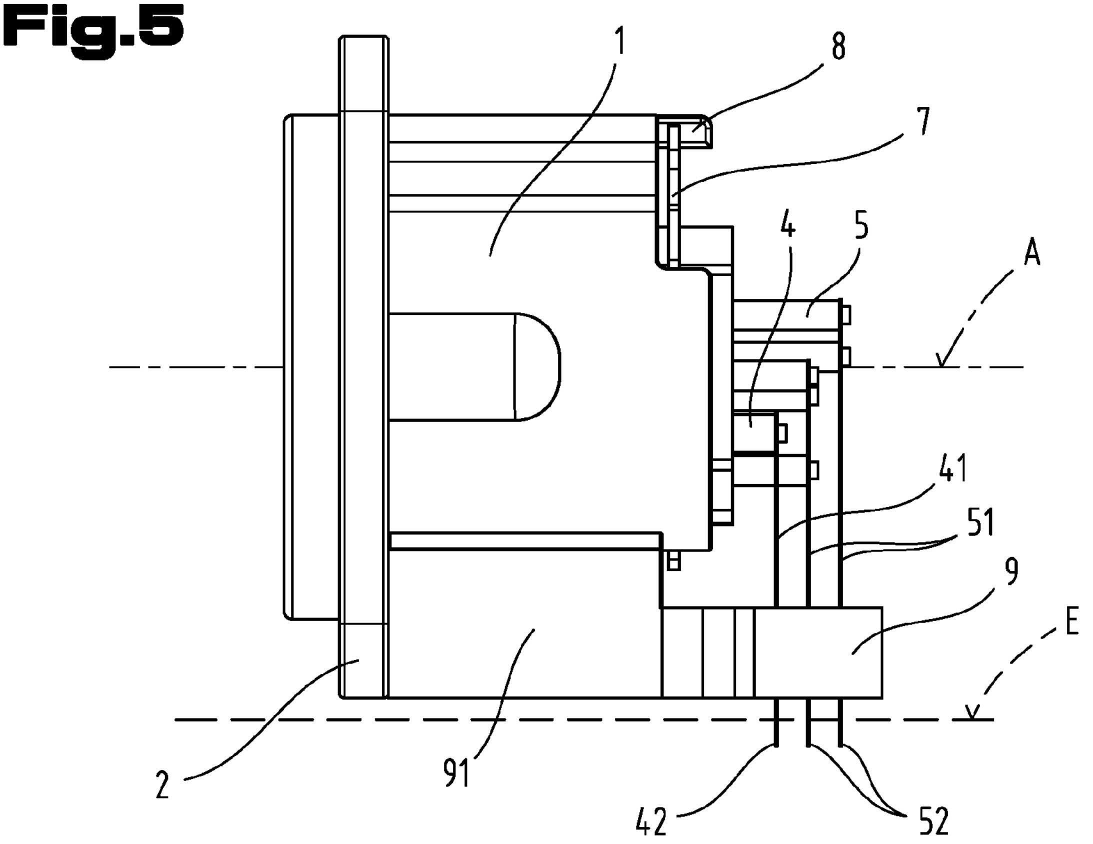

These show in a respectively very simplified schematic representation:

FIG. 1 a perspective view of a first embodiment of a built-in plug connector according to the invention, FIG. 2 a front view of the socket of FIG. 1 from the insertion direction, FIG. 3 a rear view from the opposite direction of FIG. 2, FIG. 4 a perspective view of the socket of FIG. 1 from the rear, and FIG. 5 a side view of the socket of FIG. 1.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The electrical built-in plug connector, shown by way of example in the attached figures in a version as an 8+2 built-in plug connector with connection option to an electronic conductor board, has a housing 1. This may be made of a plastic material but also of a metallic material.

On the front end face, on the insertion side of a complementary cable plug connector, a rectangular and/or square mounting flange 2 is provided as a mounting structure projecting transversely to the longitudinal axis A of the housing 1 At two corners of this mounting flange 2 opposite one another with respect to the longitudinal central axis A, mounting bores 3 are formed in order to be able to fasten the built-in plug connector on a control panel, a device wall or the like by means of mounting screws, rivets or similar fastening means reaching through these mounting bores 3. The mounting flange 2 could also be designed to be circular, elliptical, having any desired polygonal circumferential edge, or in a similar fashion. Alternatively, mounting eyes having bores and laterally projecting from a cylinder-shaped housing 1 are also possible, wherein two eyes opposite one another with respect to the longitudinal axis A of the housing 1 are preferred.

In the shown exemplary embodiment as a male plug, the housing 1 is surrounded by a total of 10 contact pins 4, 5. They are held in a contact carrier 6 (see FIG. 3 and FIG. 4), which is preferably manufactured separately from the housing 1 and is inserted into the housing 1 in parallel with the longitudinal axis A of the same. The contact carrier 6 consists of an electrically insulating material, in particular of plastic, and leaves the end sections pointing to the complementary plug connector exposed. For the female embodiments, the contact carrier 4, which then extends all the way to the front end face of the housing 1, accommodates annular or hollow-cylindrical contact elements.

In the 8+2 variant of the built-in plug connector explained here, two contacts 4 are provided for the transfer of energy and eight contacts 5 are intended for data transfer. In this regard, the contacts 4 for the transfer of energy are preferably designed to have a greater diameter than the thinner contacts 5 for data transfer.

The contact elements, in this case the contact pins 4, 5, extend in parallel with the longitudinal axis A of the housing 1 and are guided outwards on the rear side of the contact carrier 4 at one end of the housing 1 or also through both components 1, 4, also in parallel with the longitudinal axis A of the housing 1, and protrude out of the housing 1 on its end face opposite the insertion side for the cable plug.

The end sections 41, 51 of the sections of the contacts 4, 5 situated outside the housing 1 are angled with respect to their sections situated inside the housing 1. These end sections 41, 51 typically extend transversely to the longitudinal axis A of the housing 1 and, at least starting from a certain distance from the contacts 4, 5, also in parallel with one another. At their outer-most ends, they transition into connection regions 42, 52 provided for connecting to an electronic conductor board. These end in a common plane E, which is situated parallel to the longitudinal axis A of the housing 1, and preferably also outside its enveloping lateral surface. The connection regions 42, 52 are arranged in groups, wherein the individual groups—as can be seen well in FIG. 4 and FIG. 5—are situated on at least three parallel straight lines G (see FIG. 4), which are part of the common plane E. In FIG. 5, these straight lines G would run through the connection regions 42, 52, perpendicular to the drawing plane.

The end sections 41, 51 may be designed as a direct continuation of the contacts 4, 5 and be brought from a direction parallel to the longitudinal axis A to a direction transverse thereto and parallel to one another by means of folding or bending. However, an embodiment as shown in the figures is preferred, in which the sections 41, 51 extending in an angled manner are manufactured as separate elements, which are then directly connected to the sections of the contacts 4, 5 guided to the outer side of the housing, for example by riveting, as can be seen in the drawings. Preferably, the end sections 41, 51 are designed as flat metal strips, wherein the connection sections 42, 52 preferably have a smaller width than the majority of the length of the end sections 41, 51.

The angled sections 41, 51 of the contacts 4, 5 are fixed in a common holding plate 9 just ahead of their connection regions 42, 52, from which holding plate 9 the connections regions 42, 52 jut out on the side facing the conductor board, in order to be connected to said conductor board. The common holding plate 9 is preferably provided with an extension 91 running along the housing 1, which extension 91 together with the holding plate 9 forms a full support and good connectability to the conductor board and also ensures the mechanically stable connection between the housing 1 and the precisely defined position of the connection regions 42, 52.

Preferably, the ends of the sections of the contacts 4, 5 guided out of the housing 1 in parallel with one another and with the longitudinal axis A have the same distance in the direction of the longitudinal axis A of the housing 1 as the parallel straight lines G and vice versa.

The contact carrier 6 preferably inserted into the housing 1 is fixed in the housing 1 on that side of the housing 1 on which the contacts 4, 5 are guided on its outer side, by means of a holding element, in this case preferably designed as a ring 7. In this regard, the ring 7 is designed to be projecting inwards, at least partially, from the rear end face of the wall of the housing 1, wherein it overlaps with the rear end face of the contact carrier 6 and thus prevents that it can be pushed rearward out of the housing 1. For this purpose, the ring 7 is fixedly connected to the housing 1 in at least one location. This connection can be established by means of crimping of a tongue 71 of the ring 7, which radially projects outwards and is guided between two dowel pins 8 of the housing 1, with these dowel pins 8.

The front insertion opening in the housing 1 preferably has a cutout 21 at at least one circumferential position, which cutout 21 continues in parallel with the longitudinal axis A of the housing 1 rearward into the interior of the housing. The contact carrier 6, as well, may have a recess 61 at a corresponding position. This cutout 21 and the recess 61 serve to receive a locking mechanism 10 of a known design, which is schematically shown in FIG. 2.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

LIST OF REFERENCE NUMBERS

1 Housing
2 Mounting flange
3 Mounting bore
4 Contact pin energy
5 Contact pin data
6 Contact carrier
7 Ring
8 Dowel pin
9 Holding plate
10 Locking mechanism
21 Cutout
41 End section of the contact 4
42 Connection section
51 End section of the contact 5
52 Connection section
61 Recess
91 Extension of the holding plate
A Longitudinal (central) axis
E Plane connection sections
G Straight line connection sections

The invention claimed is:

1. An electrical built-in plug connector comprising:

a housing (1) with at least one mounting structure (2) projecting transversely to a longitudinal axis of the housing, with a contact carrier (6) made of electrically insulating material, which is inserted in the housing (1) in parallel with its longitudinal axis (A), with more than five electrical contacts (4, 5) fixed in the contact carrier (6), wherein the contacts (4, 5) are guided outwards out of the contact carrier (6) and the housing (1) at one end of the housing (1) parallel to the longitudinal axis (A) of the housing (1), wherein end sections (41, 51) of sections of the contacts (4, 5) located outside of the housing (1) are angled relative to sections located inside the housing (1), and connection sections (42, 52) are provided for connecting to a circuit board end in a common plane (E), which plane (E) is parallel to the longitudinal axis (A) of the housing (1), wherein connection regions (42, 52) of the electrical contacts are arranged in groups, and each individual group of the groups are situated on at least three parallel straight lines (G), which are part of the common plane (E), wherein ends of the sections of the contacts (4, 5) guided in parallel out of the housing (1) have the same distance in a direction of the longitudinal axis (A) of the housing (1) as parallel straight lines (G), and the contact carrier (6) is fixed by means of a holding element (7) on a side of the housing (1) on which the contacts (4, 5) are guided on its outer side.

2. The built-in plug connector according to claim 1, wherein eight contacts (5) for data transfer and two contacts (4) for energy transfer are provided.

3. The built-in plug connector according to claim 2, wherein the contacts (4) for energy transfer have a greater diameter than the contacts (5) for data transfer.

4. The built-in plug connector according to claim 1, wherein the holding element (7) is a ring projecting inwards from a housing wall at least in some locations and connected to the housing wall in at least one location.

5. The built-in plug connector according to claim 1, wherein the holding element (7) and a housing wall are crimped together in at least one location.

6. The built-in plug connector according to claim 1, wherein the electrical contacts (4, 5) are designed as contact pins.

7. The built-in plug connector according to claim 1, wherein the electrical contacts (4, 5) are designed as at least circular contact openings.

8. The built-in plug connector according to claim 1, wherein the mounting structure (2) is at least a laterally projecting eye having a mounting bore (3).

9. The built-in plug connector according to claim 1, wherein the mounting structure (2) is a flange projecting over an entire circumference of the housing (1), in which flange at least one mounting bore (3) is formed.

10. The built-in plug connector according to claim 1, wherein the angled end sections (41, 51) extend straight and, over a majority of their length, in parallel to one another.

11. The built-in plug connector according to claim 1, wherein the angled end sections (41, 51) are separate elements and are directly connected to the sections of the contacts (4, 5) guided on the outer side of the housing (1).

12. The built-in plug connector according to claim 1, wherein the angled end sections (41, 51) are fixed in a common holding plate (9) just ahead of their connection regions (42, 52).

13. The built-in plug connector according to claim 12, wherein the common holding plate (9) has an extension which extends so as to abut along the housing (1).

* * * * *